Nov. 27, 1934.  H. M. SUTTON ET AL  1,982,601
PROCESS AND APPARATUS FOR THE SEPARATION OF PARTICLES COMPOSING A MASS
Filed May 11, 1929    4 Sheets-Sheet 1
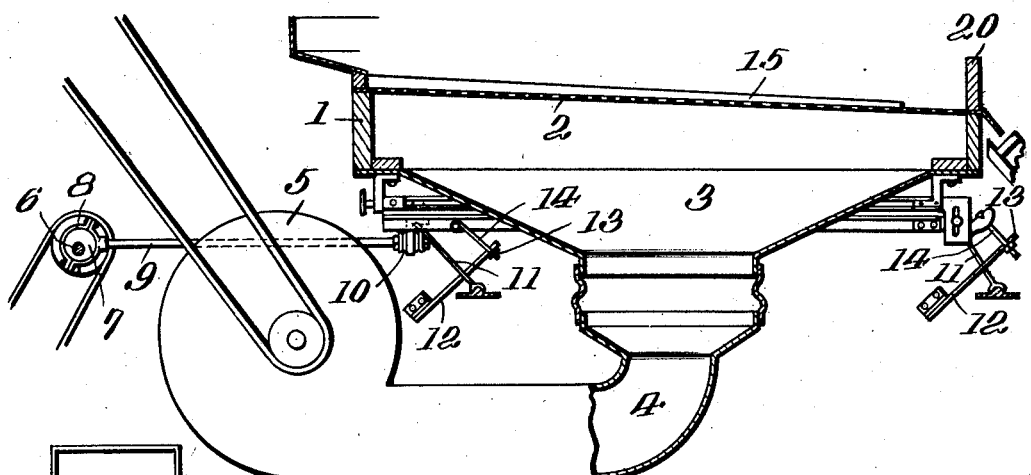
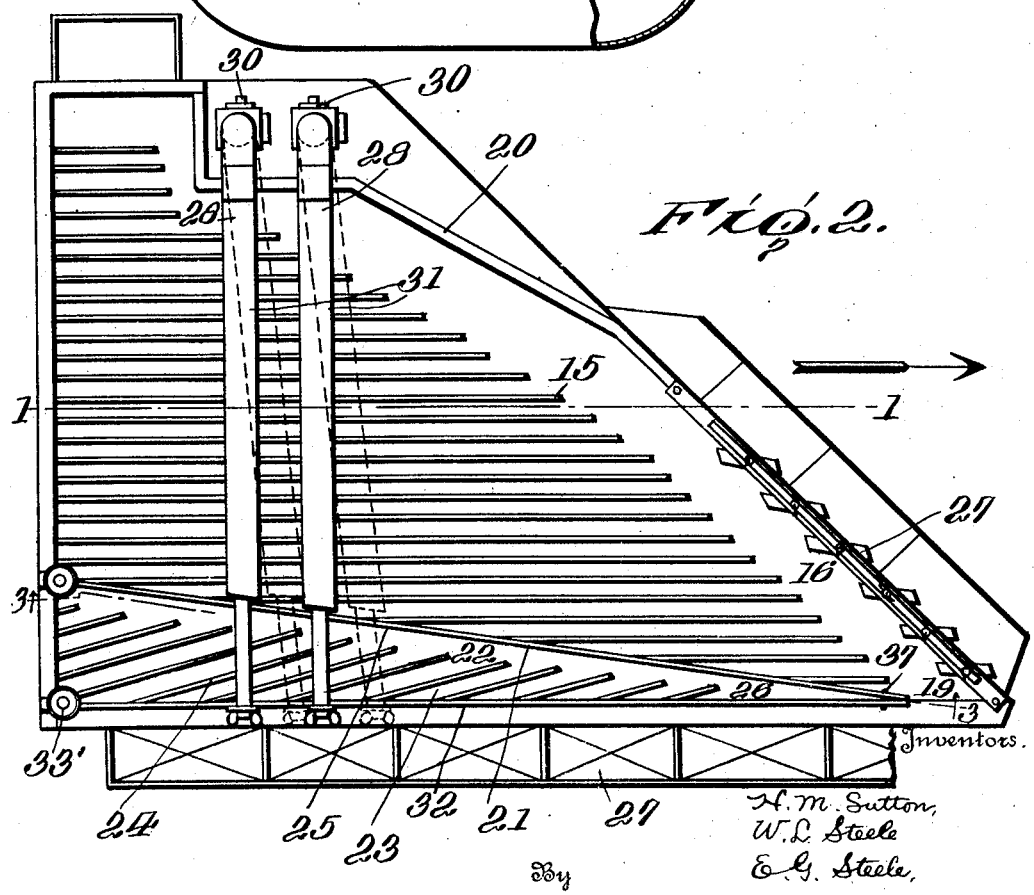

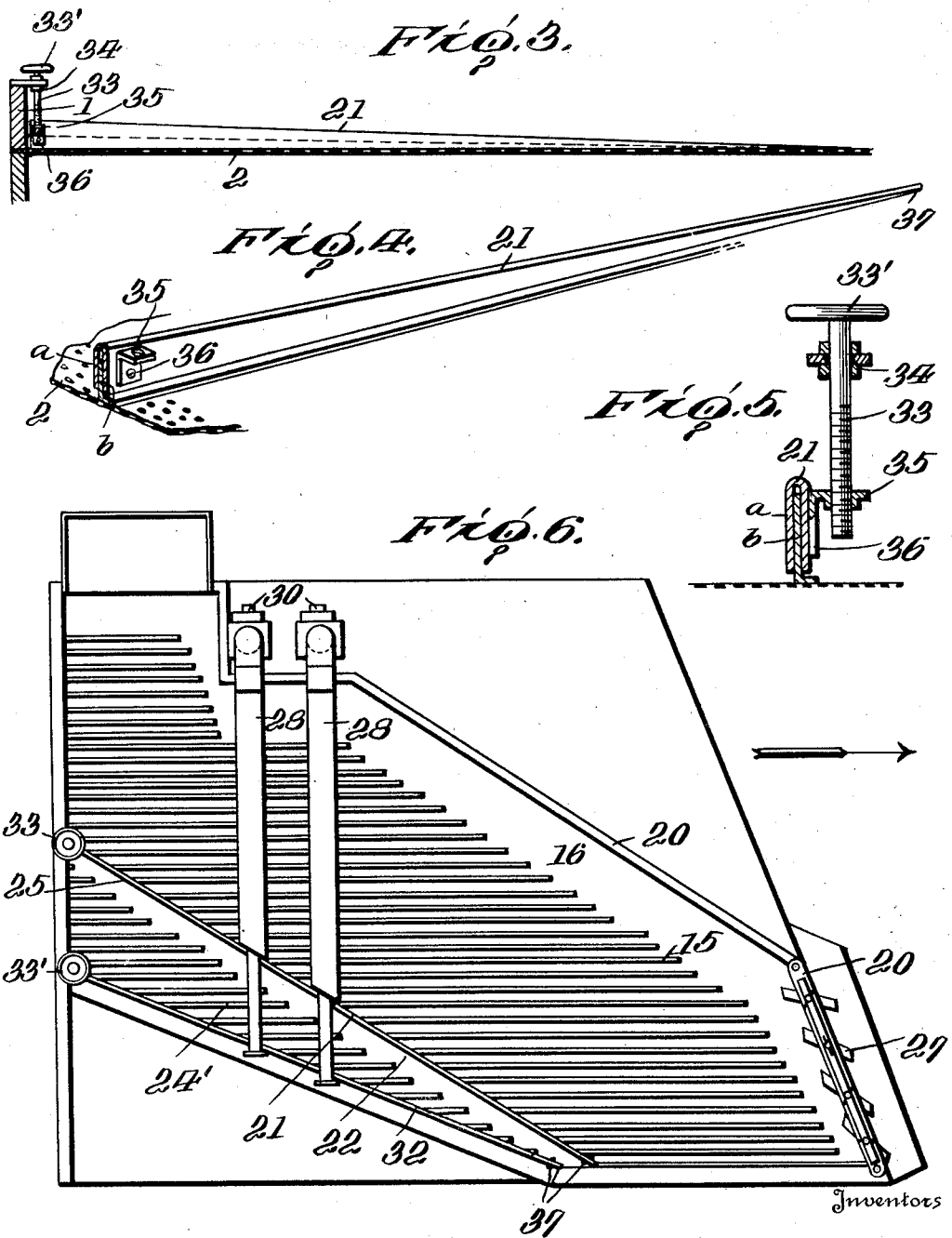

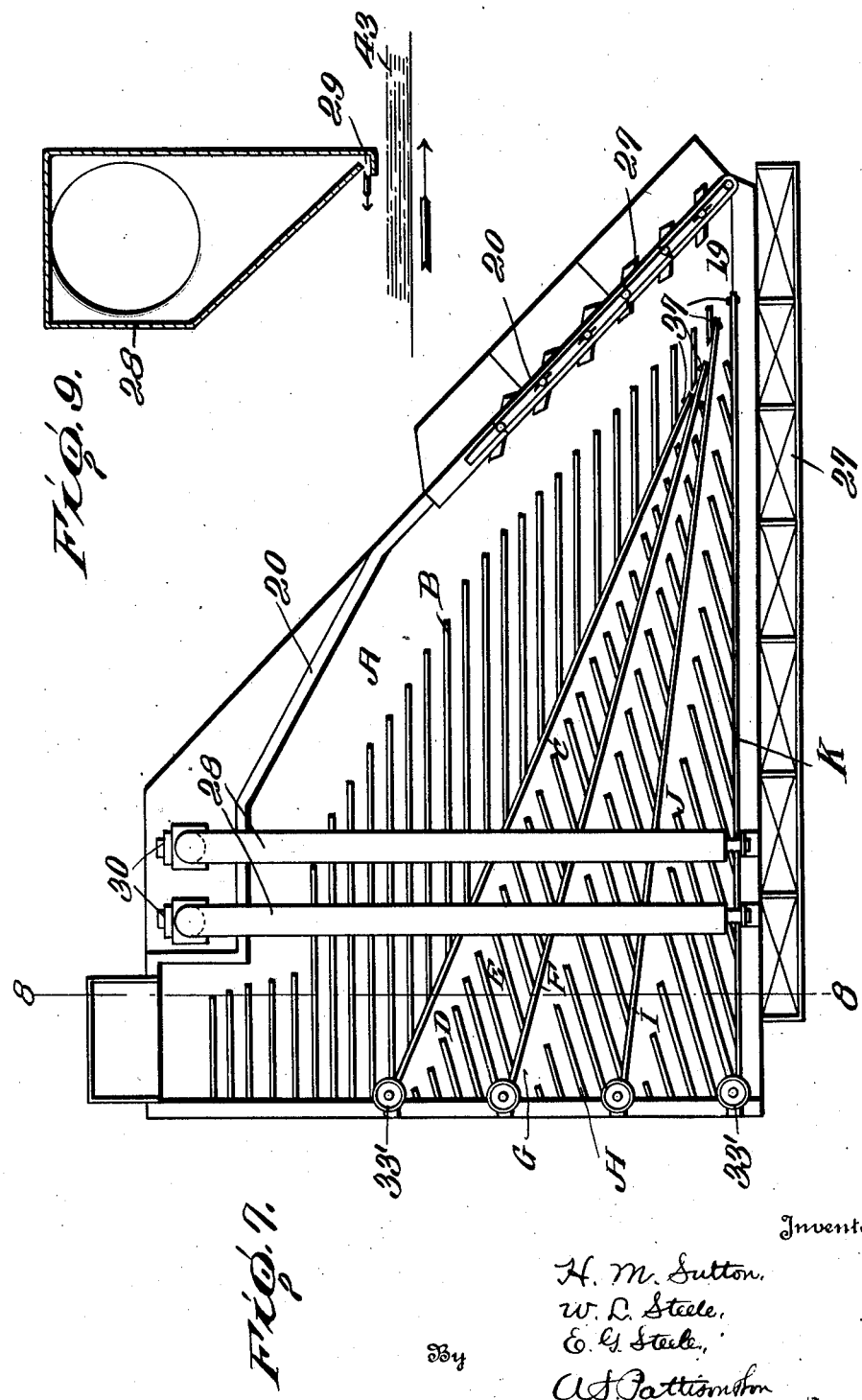

Nov. 27, 1934.   H. M. SUTTON ET AL   1,982,601
PROCESS AND APPARATUS FOR THE SEPARATION OF PARTICLES COMPOSING A MASS
Filed May 11, 1929   4 Sheets-Sheet 4
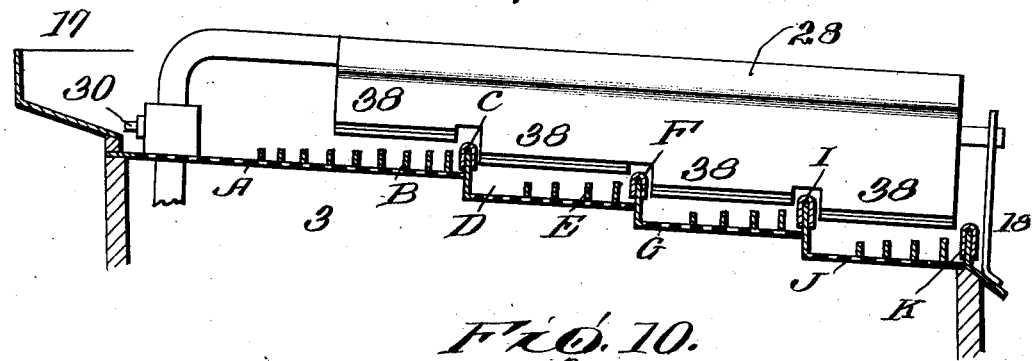
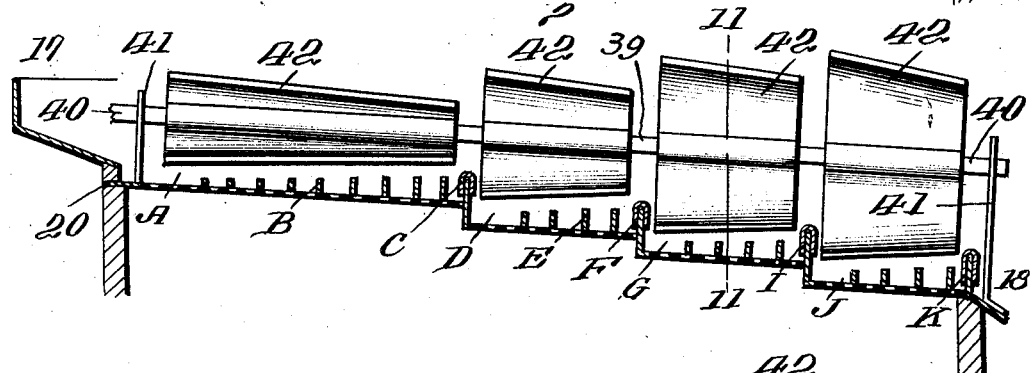
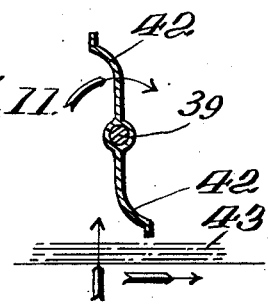
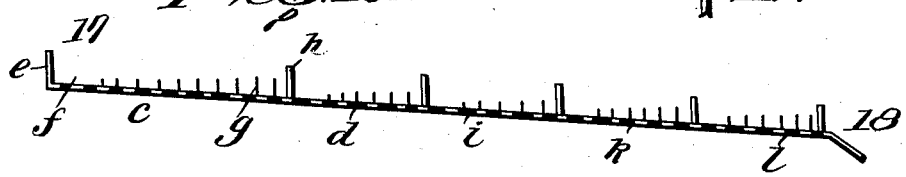
Inventors
H. M. Sutton,
W. L. Steele,
E. G. Steele,
By A. S. Pattison & Son
Attorney Patented Nov. 27, 1934

1,982,601

UNITED STATES PATENT OFFICE 1,982,601

PROCESS AND APPARATUS FOR THE SEPARATION OF PARTICLES COMPOSING A MASS

Henry M. Sutton, Walter L. Steele, and Edwin G. Steele, Dallas, Tex.

Application May 11, 1929, Serial No. 362,406

17 Claims. (Cl. 209—467)

This invention relates to certain improvement in the process and apparatus for the separation of particles composing a mass and this comprises, first a process by which the different particles of the mass to be operated upon are separated and cleaned, and secondly an apparatus adapted to practice the process.

The apparatus here shown is the preferred form for carrying out the process but we desire it understood that the apparatus may be varied in many particulars and is only meant to be one mechanical expression thereof for carrying out the process.

This improvement, both the process and the apparatus, is adapted to separate coal and cereals including coffee beans and other masses of material.

At the present time all coffee is hand separated, and so far as we are aware we are the first to produce a method and an apparatus which is adapted to separate the coffee bean and to clean the chaff, refuse or other light particles therefrom. This separation and this apparatus means an enormous saving in the cost of hand separation and cleaning heretofore used.

In a broad sense apparatus have heretofore been used for separating ores, coal, cereal etc. in which there is a pervious deck and air is fed from below through this pervious deck on which the mass of material to be separated and cleaned has been placed, and the prior processes used in the separation of other materials than coffee has been due largely to the difference in specific gravity of the light and heavy particles that compose the mass. Heretofore the air passing through the pervious deck has always been under sufficient pressure to blow or separate the smaller particles from the larger ones. We have discovered after years in the practice of the prior processes that the separation and cleaning is very much facilitated by having the air pressure only sufficient to permit the very small particles to remain for the purpose of filling up the void or spaces between the larger particles which prevents the otherwise too rapid escape of air within the mass and to cause the air to more slowly seep through the top of the mass or bed of material. Under these conditions the bed of material does not present a boiling appearance, which is true in prior processes used for separation and cleaning of materials, but to the contrary the mass remains on the deck in a condition of almost a perfect fluid. In the practice of the old method these very small particles are not in substantially perfect fluid state, but to the contrary are in a boiling condition thereby permitting the too rapid escape of the air from the bed or mass of material.

Therefore one object of the present invention is to cause the separation and cleaning of the refuse from the coffee beans which consists in feeding the same on a pervious reciprocating deck and feeding air from below through the pervious deck under pressure which creates a substantially perfect fluid condition of the mass as contradistinguished from the old boiling method of separation.

This may be expressed in various forms as will be readily understood, but always it is to cause the mass to remain in the above described condition.

A further object of this invention is in the preferred form of apparatus here shown and described for practicing the separating process.

In the drawings:

Figure 1 is a cross sectional view of the deck on dotted line 1—1 of Figure 2, showing the construction and the means for supplying air to the pervious deck and of reciprocating the said deck.

Figure 2 is an enlarged top plan view showing the form of deck shown in Figure 1.

Figure 3 is a longitudinal section on the dotted line 3—3 of Figure 2 showing the adjustable tailings riffle.

Figure 4 is a separate detached view of the tailings riffle shown in Figure 3.

Figure 5 is a sectional view showing the means for vertically adjusting the adjustable riffle.

Figure 6 is a plan view of a slightly modified deck.

Figure 7 is a plan view of a deck further modified.

Figure 8 is a cross sectional view on dotted lines 8—8 of Figure 7.

Figure 9 is an enlarged cross sectional view of the blowing bar.

Figure 10 is a cross sectional view of the deck shown in Figure 7 showing revolving fan-like members to be used in place of the blowing bar in connection with any of the decks herein shown.

Figure 11 is a cross sectional view on the dotted line 11—11 of Figure 10.

Figure 12 is a diagrammatic substantially cross sectional view showing a modification of the deck differing in the manner hereinafter described from the other decks shown, the inclination being changed to suit the character of the work.

Referring now particularly to the drawings, 1 represents a suitable frame work that in plan outline corresponds to the outline of the deck shown in Figure 2. It will of course be understood that this frame will vary in shape according to the specific shape of the deck. Extending across the upper portion of the frame work 1 is a pervious deck 2, which consists of either very fine wire or cloth and below this deck there is an air chamber 3 that is connected through a suitable pipe 4 with a fan 5 for supplying air below the deck 2, the air being forced through the deck in a manner already stated and described hereinafter in the process.

A suitable shaft 6 carries an eccentric 7 around which eccentric an eccentric strap 8 passes and connected with this strap is one end of a rod 9 the opposite end 10 of the rod being suitably connected with the under portion of the framework 1 of the deck 2. This framework together with its deck is supported on suitable inclined rock levers 11, which levers are inclined downwardly. From this it will be understood when the machine is being reciprocated and it moves forward it is slightly lifted upward and when it moves rearward it slightly drops. Suitable springs 12 have their lower ends connected with a suitable support, not shown, and the upper ends 13 are connected by means of a connecting bar 14 with the lower portion of the deck. It will be understood that the deck is supported on these rocking supports or levers 11. The object of the springs is to assist in the backward movement of the deck. This deck is reciprocated quite rapidly so that it moves forwardly and upwardly and then drops backward suddenly. It will be understood that the heavier particles are naturally at the power portion of the deck and between the riffles 15 and the particles that are between the riffles are projected from its feed end to its discharge end and into the space 16 while the lighter particles flow across the deck and escape at its lower edge. As shown in Figures 8 and 10 and 12, the deck is declined from its feed side or end 17 to its delivery side 18 whereby the material above the riffles 15 flows by gravity crosswise the table.

Referring to Figure 2 we especially call attention to the fact that when the invention is applied to the separation of coffee beans from refuse, the coffee beans are progressed lengthwise the table, to what may be termed a clearance space 16 and when they reach that space they are stopped in their lengthwise travel and most of them flow down that space to the discharge point 19. The coffee beans are stopped in their lengthwise movement and they form an obstruction that extends across the ends of the riffles. The object of this is to cause this obstruction to act on the refuse if any is mixed with the beans so that the refuse falls backward and flows by gravity crosswise the table in the direction of its lower side. We have shown in the drawings and particularly in Figures 1 and 2 a banking bar 20 which serves to stop the coffee beans from traveling further lengthwise the deck. We desire it understood however if it is necessary this banking bar can be removed and the inclination of the table increased so that the beans when they reach the space 16 and have escaped from between the riffles 15 will not be further projected lengthwise the table so that they pile up and form an obstruction that acts in the manner above described. It will be understood from the immediate preceding sentence and from other parts of the specification, that the banking effect can be varied by increasing or decreasing the longitudinal inclination of the deck. The banking bar is considered the most efficient but the banking bar 20 may be omitted but yet this obstruction will be formed.

The lighter particles fall crosswise the deck to its lowest edge until the tailings riffle 21 is reached. This tailings riffle is slightly higher than the riffles 15. The object of this tailings riffle is to enable the mass that is separated from the coffee beans to flow over this tailings riffle into the space 22 and they fall on an auxiliary deck 23 the deck 23 being provided with riffles 24. This tailings riffle has its lower side 25 arranged at the upper side of the space 22 whereby its lower face or side acts as a banking bar for the heavier particles that fall over the riffle 21 whereby another obstruction is formed in the space 22 that acts the same as the material in the space 16, the heaviest particles traveling down the space 22 to its outlet end 26 while the lighter particles above the riffles 24 flow transversely this auxiliary deck and they are delivered in suitable receptacles 27 located at the lower edge of this deck.

In operation the lightest particles from the main deck of Figure 2 flow over the tailings riffle 21 nearest the feed side thereof and the next heaviest particles reach or report various distances between the feed or lift side of Figure 2 to the delivery space 26 and as many divisions of these heavier particles can be arranged as may be desired and delivered in separate receptacles. Likewise the heavier particles from the main deck are delivered through the opening 19 into a suitable receptacle located below it into which they fall.

From plan views Figs. 2, 6 and 7, and from the description it will be understood that the lighter particles escaping over the tailings riffle C Fig. 7 and 21 in Figs. 2 and 6, pass to the unobstructed portion marked 16 in Figs. 2 and 6, and all of these lighter particles are recleaned on the bed E of Fig. 7, and corresponding unobstructed portions 22 of Fig. 6 and also the corresponding unobstructed portion of other figures of the drawings.

One of the objects of the banking bar 20 is that this bar can be provided with any desired number of gates 27 and the coffee or heavier particles can be permitted to escape through these openings thus relieving the space 16 to some extent of the accumulated heavier particles or coffee beans.

It will be understood of course that the auxiliary deck 23 is in a plane below the main deck so that the particles composing the mass that fall over the tailings riffle 21 fall on the auxiliary deck at a level below the main deck.

It will be understood that the separated heavier particles of coffee beans gradually increase from the upper to the lower end of the space 16 and for this reason the gates 27 are arranged to relieve the table of part of these separated beans and thus prevent it from increasing to such an extent that it might interfere with the separating process. These gates can be closed however if desired, and if the character of the material being acted on does not require that the space 16 should be relieved of the heavy separated particles.

Extending across the main deck in Figure 2 is what we term blow bars 28 of which there may be one or more. These blow bars extend across the line of reciprocation of the deck and they have at their lower edges a horizontal opening or narrow slots 29 through which air flows in the direction indicated by arrow. It will be noted that the air passing from the opening 29 is in a direction opposite or against the feeding of the material due to the reciprocation of the deck. This opening extends throughout the length of this bar and these bars are connected with the air chest or chamber 3 so that air flows from this chamber into the blow bars and through the openings 29. These openings preferably extend throughout the length of the bars. These bars are provided with any form of gate 30 for the purpose of controlling the amount of air fed to them from the air chamber 3 and thereby the amount of air passing through the bars. These gates may be of any well known type and a particular type of gate is not here shown. These pneumatic blow bars are placed at right angles to the table thrust, but it is frequently placed at a slight angle to the thrust, as shown in dotted lines 31 of Figure 2, in which case the counter air currents not only blow backwards against the thrust of the material, but also slightly downward or towards the discharge of the material by gravity, thus accelerating the gravity flow of any of the light floating material which might have a tendency to cling to or ride on the surface of the deck load.

By reference to Figs. 2, 6 and 7, it will be observed that the blow bars 28, shown in cross-section Fig. 9, are located adjacent the feed of the table. It will also be observed by reference to Fig. 9 that air passing through the opening 29 flows in the direction indicated by a small arrow and that the direction of flow of the mass on the table is in the opposite direction as indicated by a larger arrow in Fig. 9. It is found that when the machine or table is treating coffee, cereals and other similar material the lighter material floating has a tendency to cling or ride on the heavy material on the deck as stated in the immediately above description. As a consequence, this clinging to the said surface is sufficient to cause the clinging material to be carried with the heavier material in the direction of and into the unobstructed portion instead of traveling laterally independent of the heavier portion and escaping over the tailings riffle. We find also that this clinging action of the lighter particles to the heavy particles tends to destroy the stratification of these two particles and prevents the separation of these two particles. By this it is meant that the lighter particles clinging to the heavier particles are carried by the heavier particles into the unobstructed portion and that the free movement of the lighter particles in the direction of the tailings riffle is seriously interfered with. To dislodge these clinging particles from the heavy particles it is necessary that they be subjected to a sufficient blast of air that will prevent them from clinging to the heavier particles and cause these lighter particles to flow towards the tailings riffle C and escape over the tailings riffle C. It will be understood that the air passing through the opening 29 of the blow bar 28 flows in a direction opposite to the travel of the mass of material on the deck as illustrated in Fig. 9. We find in operation that it is essential to dislodge the lighter particles from the heavier particles at or near the point of feed. Therefore, we apply this pneumatic skimming action on the surface of the mass, whereby these clinging particles are blown back and caused to flow towards the tailings riffle. We have found that these clinging lighter particles must be removed without disturbing the stratification of the lower heavier particles.

The function of the auxiliary deck 23 is to reclean that part of the mass escaping over the tailings riffle 21. There is a certain amount of heavier particles of the coffee beans in the mass escaping over the tailings riffle 21 and the function of this auxiliary table 23 is to reclean this mass and recover the good part of the mass while permitting the lighter refuse to flow over the lower tailings riffle 32. For that reason the bar 21 is referred to as a tailings riffle and in this particular instance it performs the double function of a tailings riffle and a banking bar as previously described.

The tailings riffle 21 is preferably adjustable as shown in Figures 3 and 4. By this it is meant that it is adjustable up and down to make it higher or lower and thus by regulating its height it regulates what portion of the mass shall escape from it. This adjustable feature can be arranged in any particular desired form. The form here shown consists in making a U-shaped member $a$ that fits over the upwardly extending portion $b$, the portions $a$ and $b$ constituting the riffle 21. Attached to the framework 1 is a screw member 33 that passes through a bracket 34 attached to the frame and has its lower end in a screw-threaded opening 35 of a bracket 36 attached to the upper end of the portion $a$. This tailings riffle gradually diminishes in height from its adjustable end to its opposite end where it is pivoted as shown at 37. By turning this screw 33 the height of the tailings riffle is conveniently regulated to suit the material being operated upon. It will thus be understood that the pivoted end 37 of this tailings riffle is substantially on a level with the deck 16, Figure 2. We desire it also understood that the other riffles 15 which are not so high as the tailings riffle also taper from their rear to their forward ends in the same manner as this tailings riffle 21 except that they are not adjustable.

The other figures of the drawings illustrate the same idea expressed in connection with Figure 2.

Referring to Figure 6 it shows the same construction as Figure 2 with the exception that the riffles 24' extend parallel the riffles 15 instead of upwardly at an angle as in Figure 6.

As will be observed by the other figures of the drawings that will be referred to, these riffles may be placed either in a line with the thrust of the table reciprocation or they may be placed at a diagonal line to the table thrust.

Furthermore it will be noticed from the drawings that the recleaning compartment or compartments have their floors depressed slightly lower than the surface of the main table deck, and that the maximum depression is at the feed end of the deck and that its opposite end rises towards and until its pointed end is level or substantially level with the main deck surface. It will also be noted that each of these recleaning decks is placed at an angle to the main deck surface thus constituting the recleaning deck or decks that extend at an angle to the main deck. We wish also to call attention to the fact that each tailings riffle for the recleaning decks also acts as a banking bar with the exception of the tailings riffle at the lower side of the construction which is the final tailings riffle.

In the operation of the apparatus here disclosed the lighter elements are thus caused to rise to the upper surface of the deck load and to flow by gravity over the next lower adjustable tailings riffle, and as a whole as the mass is being propelled forward or towards the discharge end of the deck the lighter elements are gradually squeezed or pinched out from the heavy particles which results in the discharge of the lighter elements and a rebanking of the heavier elements to insure a more perfect separation whereby the whole operation results in an increased capacity and in a more thorough and efficient cleaning of the mass.

Referring now briefly to the figures of the drawings not already mentioned which show a plurality of recleaning decks, it will be seen that as shown in Figure 7 the main deck A has riffles B and a combined tailings and banking bar C between the main deck and a recleaning deck D with riffles E having at its lower edge a combined tailings riffle and banking bar F for the table G having riffles H and a combined tailings riffle and banking bar I for the table J and that this last table J has an ordinary tailings riffle K at its lower edge.

All of the riffles of the recleaning deck may be made either parallel with the riffles 15 of the main deck or they can be placed on an incline as shown in Figure 7, or some of them inclined and others parallel to the reciprocation as may be desired or convenient or controlled by the material being acted upon.

In Figure 8 is shown the blowing bar 28 and it will be seen that this blowing bar is provided with downwardly stepped projections 38, each one being increased in depth sufficiently to bring its lower edge substantially on a level with the mass of material on each particular deck.

In Figures 10 and 11 is shown a modification of a blowing device or a device to create a draught of air tending to lift the lighter particles from the surface of the mass. It will be observed that in the Figures 10 and 11 is a shaft 39 journaled at its ends 40 in suitable brackets 41 and on this shaft are the elongated blade portions 42 which as they revolve pass close to the top surface of the mass 43 shown in Figure 11 and these blades revolve to cause their edges to travel against the direction of travel of the mass 43. As these blades revolve the air is disturbed adjacent the surface of the mass 43 and the lighter particles are disengaged from the mass and prevented from riding with it and these separated particles then flow by gravity the same as has been described in connection with the blowing bars 28. These shafts 40 can also be placed at an angle to the main deck the same as described in connection with the blowing bar 21 so as to facilitate the movement of the separated lighter particles by gravity to the lower edge of the decks.

In Figure 12 we have shown a slight modification as to the arrangement of the recleaning decks, whether one or more of the recleaning decks be used. It will be observed that the deck is on a gradual incline from its upper end 17 to its lower end 18. That part of this deck indicated by c is the main deck to which is attached the recleaning deck d if only one recleaning deck is to be used. Instead of dropping this recleaning deck down as shown in Figures 8 and 10 there will be a gradual inclination of the deck and it will be also observed that in cross section this recleaning deck is on a horizontal plane below the main deck c above. The banking bar e for the main deck c and the clearing space f with its riffles g and having its combined tailings riffle and banking bar h constitute the main deck. The remaining recleaning deck d or if other recleaning decks i, k, and l, are used, they will all operate and be constructed substantially as shown in the preceding drawings with the exception that the decks will be placed on a gradual inclination instead of on a stepping arrangement shown in Figures 8 and 10.

It will be understood from the above description that the mass being separated is subjected to an upward air pressure, the heavier particles of the mass made to travel until they reach a clearance space where their travel in a longitudinal direction is stopped and an obstruction formed of the heavy particles to the lighter particles and that the obstruction continues to flow by gravity and is continually being formed in the carrying forward of the process in the space 16 and that at the same time the lighter particles are caused to travel by gravity across the said deck to the tailings riffle at its lower side when these lighter particles flow thereover. When a recleaning deck is used the upper stratum composed of the lighter particles flows over to the recleaning deck where it is again recleaned and the valuable portions thereof reclaimed.

We do not wish to be limited to the exact process nor to the exact apparatus as it is well understood these may be changed with certain respects without varying the invention sought to be covered in our patent.

Referring to Figures 10 and 11 showing the revolving blowing bar, this blowing bar may be driven either by the mechanical means of a belt, or an air motor, or electric motor or similar applied power, none of which is herein shown as the motor would be of the ordinary construction. In Figures 10 and 11 the vanes 42 as shown on the drawings is such that the air passing through the deck impinges on the curved blade surface and this causes the bar to revolve. This is due to the fact that in the turning of the vane the surface presented to the ascending air is first concave and then convex, the concave surface acting as the pressure side. This is the same scheme as is frequently observed in barber poles or revolving signs of similar nature, which devices are driven by the wind the same as a windmill, the air pressure being upward through the deck portion and acting to cause the vanes to revolve.

Having thus described our invention, what we claim and desire to secure by Letters Patent, is:

1. An apparatus for the separation of particles comprising a main pervious deck having a clearance space located to receive the heavy particles and extending across the deck, a tailings riffle located at the lower side of the deck from which the tailings pass and a recleaning deck located beyond the said tailings riffle the opposite side of the said tailings riffle of the main deck acting also to cause a recleaning of the material escaping over the tailings riffle, the parts adapted to operate as set forth.

2. A separating deck comprising two decks, a main deck having at one side a clearance space the said deck having at its lower side a combined tailings riffle and banking bar, and a recleaning deck located just beyond the banking bar whereby the material escaping over the tailings riffle is reseparated by the action of the banking bar, for the purpose specified.

3. A separating table having a main deck and a recleaning deck, the main deck having riffles extending longitudinally thereof, means for reciprocating the deck longitudinally and a recleaning deck receiving the uncleaned mass from the main deck, a tailings riffle separating the two decks, the recleaning deck having riffles arranged to form a passageway between their ends and the said riffle of the main deck, whereby the intervening riffle acts as a riffle and as a banking bar.

4. A separating table comprising a main deck provided with riffles extending substantially longitudinally thereof, means for reciprocating the table in a direction longitudinally of the riffles, and a recleaning deck connected with the main deck and a tailings riffle separating said decks, the recleaning deck having riffles extending forward at an inclination to the line of reciprocation of the main deck, for the purpose specified.

5. A separating table comprising a main deck reciprocating in a longitudinal direction, the main deck inclined transversely, and a blowing bar or an equivalent thereof extending diagonally across the deck with its lower end nearer the delivery end of the table than its upper end, whereby the lighter material is caused to flow in the direction of gravity.

6. A separating table comprising a main deck and one or more recleaning decks, the feeding end of the recleaning deck being in a plane below the feeding end of the main deck, the recleaning deck inclined upwardly until its delivery end is substantially in the same plane as the delivery end of the main deck.

7. An apparatus for the separation of particles of a mass, comprising a main pervious deck provided with riffles, means for reciprocating the said deck in the direction of the said riffles, the said deck having at one side a space into which the heavy particles flow, the opposite side of the deck having a tailings riffle, a recleaning deck located parallel the said tailings riffle and into which the separated elements from the main deck flow, the said deck having at its outer side a second riffle extending substantially longitudinal the first said tailings riffle whereby the mass escaping from the main deck is recleaned and its heavy particles flowing adjacent the first riffle in the manner set forth.

8. An apparatus for the separation of the particles of a mass, comprising a pervious reciprocating deck having riffles extending in the direction of the reciprocation, said deck having at one side a space for the flow of the heavy particles thereby forming an obstruction to the lighter particles, the opposite side of the deck provided with a tailings riffle and an obstruction space extending longitudinally the tailings riffle and located outside thereof whereby that part of the mass flowing from the tailings riffle is recleaned of its heavy particles, for the purpose set forth.

9. An apparatus for separating the heavier particles from the lighter particles of a mass, comprising pervious reciprocating decks connected together, said decks arranged side by side in a direction transverse the reciprocation of said decks, one deck being a main deck to which all of the mass is fed, and the additional deck receiving the separated lighter particles from the main deck, and means for supplying air beneath said decks substantially throughout the extent thereof.

10. An apparatus for the separation of the heavier particles from the lighter particles of a mass, comprising a plurality of pervious reciprocating decks located side by side in a direction at an angle to the reciprocation of the decks, each deck having an unobstructed portion for the heavier separated elements, the unobstructed portions of the said decks located at the same sides thereof, whereby one deck is the main deck and the other deck is a recleaning deck, the parts combined for the purpose specified.

11. A reciprocating separating table having a main deck and a recleaning deck arranged side by side transverse said reciprocation operating as described, a combined tailings riffle and banking bar extending in substantially the direction of reciprocation and located between said tables, said bar acting as a tailings riffle for the main deck and as a banking bar for the recleaning deck.

12. A reciprocating separating table comprising a main deck and a plurality of recleaning decks arranged side by side transverse said reciprocation said recleaning decks receiving the unclean material from the main deck, a combined tailings riffle and banking bar extending substantially in the direction of reciprocation and located between each of the said decks whereby the said bar acts in the manner described.

13. A reciprocating separating table comprising a main deck having a recleaning deck attached thereto and located at one side of the main deck, a combined tailings riffle and banking bar located between the said decks, whereby the overflow of unclean material from the main deck falls on the recleaning deck and the heavier particles escaping in rear of said tailings riffle in a line longitudinal said decks and the lighter particles escaping from the recleaning deck in a direction substantially transverse the last said deck.

14. An apparatus for separating particles of a mass comprising main and recleaning decks, means for reciprocating said decks, said decks declined transversely, said main deck having at its high side an unobstructed space for the heavy particles, a member acting as a tailings riffle and an unobstructed space in which the heavy particles are banked and located at the low side of the main deck and at the opposite side of said tailings riffle of said first named deck whereby serving to separate the said decks, the parts operating as specified.

15. A separating apparatus comprising reciprocating pervious main and recleaning decks for separating the light and heavy particles of a mass, said decks inclined transversely, each deck having an unobstructed space at its high side extending substantially from the feed end to the discharge end thereof, said reciprocation causing the heavy particles to travel in said unobstructed space, the recleaning deck located at one side of the main deck in a direction transverse the reciprocation thereof and thereby in parallel relation, the separated lighter particles of the main deck flowing into the unobstructed portion of the recleaning deck whereby substantially a complete separation of the heavier particles and lighter particles of the whole mass is accomplished.

16. A separating table comprising a deck having longitudinally extending riffles, said deck being perforated, means for feeding air upward through the said perforations and for reciprocating the said deck, the deck inclined transversely from its delivery edge whereby the lighter particles tend to flow by gravity therefrom, a blowing bar located substantially at the feed end of the deck and located substantially just above the mass of material on the deck said blowing bar constructed to deliver air at the feed end only and in a direction opposite to the direction of the travel of the material, whereby the lighter floating material is loosened from the top of the mass and caused to flow by gravity to the delivery side of the table.

17. The herein described process of separating particles of a mass of different characteristics which comprises reciprocating and feeding forward a mass on a pervious table, separating the heavier particles from the lighter particles by forming an obstruction of the heavy particles thereby separating the lighter particles therefrom, then separating the lighter particles from the remaining unseparated mass by causing said unseparated mass to escape from the first stage of separation and introducing it substantially directly on a second obstruction of heavier particles formed by the movement of said heavier particles of said unseparated mass and reclaiming the same by causing the heavy particles to move towards said last mentioned obstruction and causing the separated lighter particles to escape therefrom in a direction substantially transverse the movement of the said second heavy particles.

HENRY M. SUTTON.
WALTER L. STEELE.
EDWIN G. STEELE.